United States Patent
Sjursen (10) Patent No.: US 10,644,532 B2
(45) Date of Patent: May 5, 2020

(54) BATTERY CHARGING SYSTEM

(71) Applicant: Bose Corporation, Framingham, MA (US)

(72) Inventor: Walter Paul Sjursen, Westborough, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 16/149,950

(22) Filed: Oct. 2, 2018

(65) Prior Publication Data
US 2020/0106293 A1    Apr. 2, 2020

(51) Int. Cl.
| | | |
|---|---|---|
| *H02J 7/04* | (2006.01) | |
| *H01M 2/30* | (2006.01) | |
| *H02J 7/00* | (2006.01) | |

(52) U.S. Cl.
CPC .............. *H02J 7/045* (2013.01); *H01M 2/30* (2013.01); *H02J 7/0021* (2013.01)

(58) Field of Classification Search
USPC ........................................................ 320/162
See application file for complete search history.

(56) References Cited

U.S. PATENT DOCUMENTS

| | | | | |
|---|---|---|---|---|
| 2010/0060232 | A1* | 3/2010 | Boyles .................. | H02J 7/0027 320/107 |
| 2010/0085008 | A1* | 4/2010 | Suzuki ..................... | B25F 5/00 320/112 |
| 2011/0121783 | A1* | 5/2011 | Boyles .................. | H02J 7/0013 320/113 |
| 2014/0306662 | A1* | 10/2014 | Kim ....................... | H02J 7/0016 320/118 |
| 2016/0141907 | A1* | 5/2016 | Mulawski ............. | H02J 7/0022 320/107 |

* cited by examiner

*Primary Examiner* — Mohammed Alam
(74) *Attorney, Agent, or Firm* — Bond, Schoeneck & King, PLLC (57) ABSTRACT

A battery charging system comprises a battery operated device, a battery charger, and a pair of electrical contacts to electrically connect the battery charger and battery operated device to enable charging the battery, wherein the battery operated device comprises at least a rechargeable battery and short-circuit protection means to prevent discharge of the battery if the electrical contacts become electrically connected, and wherein the battery charger comprises at least monitoring and control circuit to charge the battery.

20 Claims, 6 Drawing Sheets

BATTERY CHARGING SYSTEM

BACKGROUND

The disclosure relates to a battery charging system, and, particularly, a rechargeable battery with short-circuit protection.

SUMMARY

All examples and features mentioned below can be combined in any technically possible way.

In an aspect, a battery charging system is provided. The battery charging system includes a battery-operated device and a battery charger. The battery-operated device includes a load circuit defining a load for the battery-operating device; a battery electrically connected to the load circuit; a first electrical terminal electrically connected to the battery; a second electrical terminal electrically connected to the battery; and, a first diode arranged between the first electrical terminal and the battery, the first diode having a first voltage drop. The battery charger has a charging circuit, the charging circuit includes a controllable power source; a monitoring and calculation circuit; a control algorithm circuit; and, a second diode arranged between the controllable power source and the first terminal of the battery-operated device when the battery charger is connected to the battery-operated device, the second diode having a second voltage drop, and the second diode electrically connected to the monitoring and calculation circuit, wherein the first voltage drop across the first diode is substantially the same as the second voltage drop across the second diode, such that the monitoring and calculation circuit and the control algorithm circuit calculate an output voltage and an output current to be sent from the controllable power source to the battery of the battery-operated device.

In an aspect, the battery-operated device further includes a first resistor arranged in the load circuit between the first electrical terminal and the battery, the first resistor having a third voltage drop.

In an aspect, the battery charger further includes a second resistor arranged between the controllable power source and the first terminal of the battery-operated device when the battery charger is connected to the battery-operated device, the second resistor having a fourth voltage drop, wherein the third voltage drop and the fourth voltage drop are substantially the same, such that the monitoring and calculation circuit and the control algorithm circuit calculate the output voltage and the output current to be sent from the controllable power source to the battery of the battery-operated device.

In an aspect, the monitoring and calculation circuit is arranged to accept a first input voltage equivalent to the output voltage of the controllable power source, a second input voltage defined as the difference between the first input voltage and the fourth voltage drop across the second resistor, and a third input voltage defined as the difference between the second input voltage and the second voltage drop across the second diode.

In an aspect, the monitoring and calculation circuit is arranged to output a first output signal, a second output signal, and a third output signal, where the first output signal is defined by the voltage difference between the third input voltage and the first input voltage subtracted from the third input voltage; the second output signal is defined by the difference between the first input voltage and the second input voltage; and, the third output signal is defined by the difference between the third input voltage and a first ground.

In an aspect, the control algorithm circuit receives the first output signal, the second output signal and the third output signal and calculates at least one fourth output signal which indicates the required output voltage and output current to be generated by the controllable power source.

In an aspect, the load circuit of the battery operated device further includes a switch arranged between the battery and the load arranged to open when the battery receives the output voltage and the output current. Additionally, the switch can be a metal-oxide-field-effect-transistor (MOSFET).

In an aspect, the monitoring and calculating circuit includes a first unity-gain difference amplifier, a second unity-gain difference amplifier, a third unity-gain difference amplifier, and a fourth unity-gain difference amplifier.

In an aspect, the battery is a rechargeable battery or a super capacitor.

In an aspect, a battery charging system is provided, the battery charging system including a battery-operated device and a battery charger. The battery-operated device including a load circuit defining a load for the battery-operating device; a battery electrically connected to the load circuit; a first electrical terminal electrically connected to the battery; a second electrical terminal electrically connected to the battery; and, a first diode arranged between the first electrical terminal and the battery, the first diode having a first voltage drop. The battery charger having a charging circuit, the charging circuit including a controllable power source; a monitoring and calculation circuit; a control algorithm circuit; a second diode arranged between the controllable power source and the first terminal of the battery-operated device when the battery charger is connected to the battery-operated device, the second diode having a second voltage drop, and the second diode electrically connected to the monitoring and calculation circuit; and, a resistor arranged between the controllable power source and the first terminal, wherein the first voltage drop across the first diode is substantially the same as the second voltage drop across the second diode, such that the monitoring and calculation circuit and the control algorithm circuit calculate an output voltage and an output current to be sent from the controllable power source to the battery of the battery-operated device and the resistor has a third voltage drop.

In an aspect, the monitoring and calculation circuit is arranged to accept a first input voltage equivalent to the output voltage of the controllable power source, a second input voltage defined as the difference between the first input voltage and the third voltage drop across the resistor, and a third input voltage defined as the difference between the second input voltage and the second voltage drop across the second diode.

In an aspect, the monitoring and calculation circuit is arranged to output a first output signal, a second output signal, and a third output signal, where the first output signal is defined by the voltage difference between the third input voltage and the second input voltage subtracted from the third input voltage; the second output signal is defined by the difference between the first input voltage and the second input voltage; and, the third output signal is defined by the difference between the third input voltage and a first ground.

In an aspect, the control algorithm circuit receives the first output signal, the second output signal, and the third output signal and calculates at least one fourth output signal which indicates the required output voltage and output current to be generated by the controllable power source.

In an aspect, the control algorithm circuit includes at least one central processing unit and at least one memory arranged to store a set of non-transitory computer readable instructions to calculate the at least one fourth output signal based at least partially on the first output signal, the second output signal, or the third output signal.

In an aspect, the load circuit of the battery operated device further includes a switch arranged between the battery and the load arranged to open when the battery receives the output voltage.

In an aspect, the switch is a metal-oxide-field-effect-transistor (MOSFET).

In an aspect, the monitoring and calculating circuit comprises a first unity-gain difference amplifier, a second unity-gain difference amplifier, a third unity-gain difference amplifier, and a fourth unity-gain difference amplifier.

In an aspect, the battery is a rechargeable battery or a super capacitor.

The details of one or more implementations are set forth in the accompanying drawings and the description below. Other features, objects, and advantages will be apparent from the description and the drawings, and from the claims.

DETAILED DESCRIPTION

Rechargeable batteries have become a common and desirable feature in battery operated devices due to the convenience of not having to replace batteries. Many different rechargeable battery chemistries have been used over the years such as lead-acid, nickel-cadmium, nickel-metal-hydride, lithium-ion, and silver-zinc. To recharge the battery in some products, the rechargeable battery is removed and placed in a separate charger, but that is inconvenient to the user. Alternatively, the battery is mounted within the product capable of being charged through a two-wire circuit. Exposure of this two-wire circuit leaves the battery susceptible to rapid discharge if the two-wire circuit experiences a short-circuit due to contact with electrically conductive foreign objects.

The present disclosure provides systems and methods to charge a rechargeable battery within a battery-operated device while accurately determining the battery current and voltage through two electrical contacts, and also protects the battery from short-circuits at the electrical contacts. In one illustrative implementation, a switch automatically disconnects the load from the battery when the battery-operated device is connected to the battery charger.

One skilled in the art will recognize that the rechargeable battery may be replaced with a capacitor to store energy and power the device. The capacitor is often called a "super-cap" and is of high capacitance. A rechargeable system utilizing a capacitor instead of a battery is within the scope of the present disclosure.

Figure 1A:
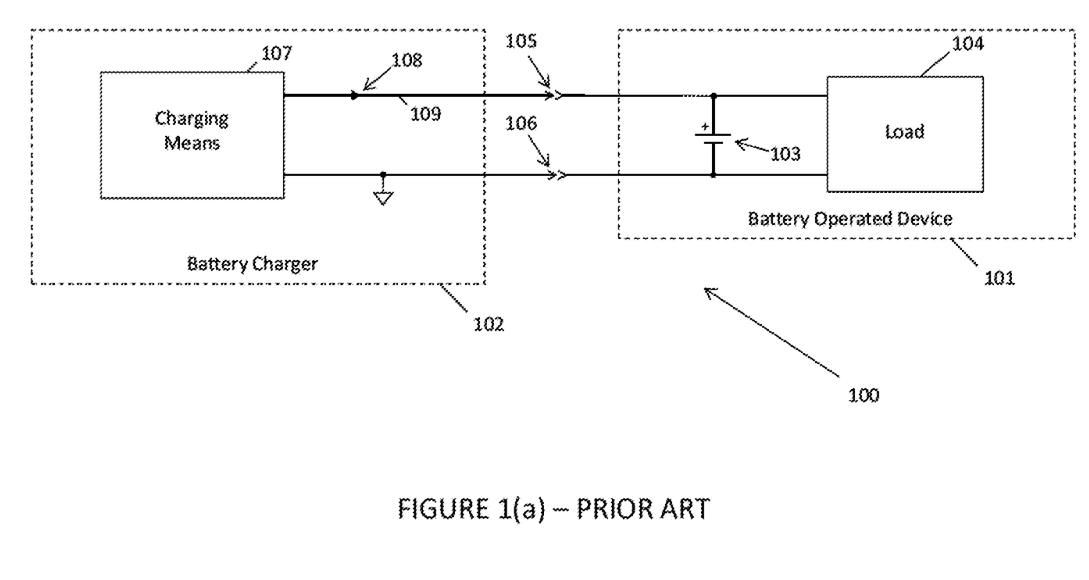
FIG. 1a illustrates a configuration of a system without short-circuit protection, according to the prior art.
Figure 1B:
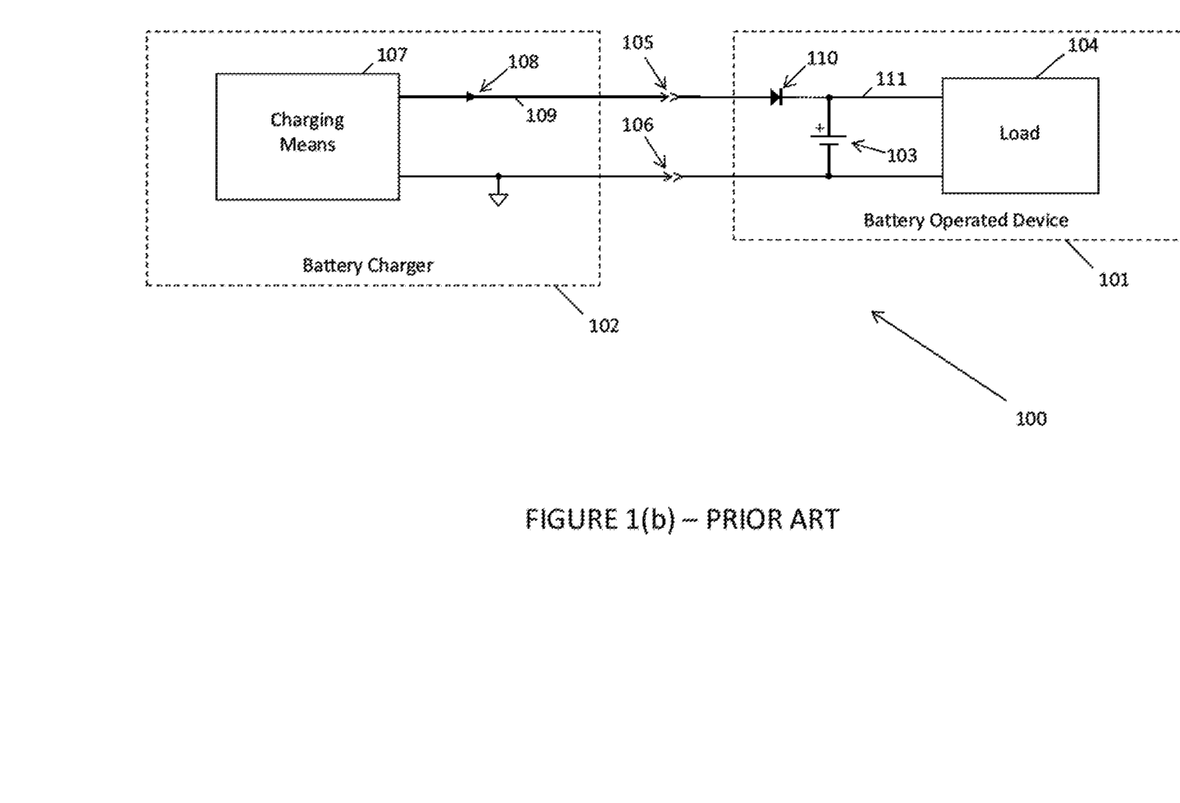
FIG. 1b illustrates a configuration of a system with short-circuit protection, according to the prior art.
Figure 2:
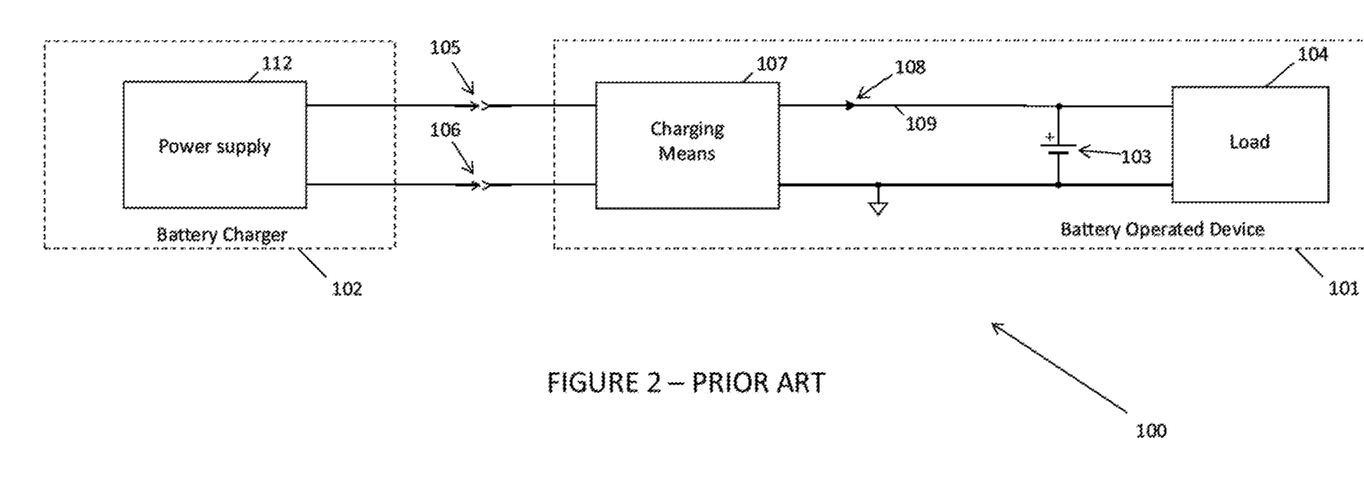
FIG. 2 illustrates a configuration of a system with charging means included within a battery-operated device according to the prior art.

Turing now to the drawings, FIGS. 1(a), 1(b), and 2 illustrate circuit arrangements according to the prior art. To overcome the disadvantage of removing the battery to recharge it, some products bring the battery terminals to a set of electrical contacts to allow charging the battery while it is still inside the product. FIG. 1(a) shows such a system 100 which comprises a battery-operated device 101 which further comprises a rechargeable battery 103, a load 104, and a battery charger 102. Battery charger 102 further comprises a charging means 107 which can monitor and control its output voltage 109 and output current 108. The battery charger 102 is electrically connected to the battery-operated device 101 through electrical terminals 105 and 106 enabling the battery charger 102 to charge battery 103.

A disadvantage of the system shown in FIG. 1(a) is that the battery terminals are exposed at electrical contacts 105 and 106 and may become short circuited. A short circuit would drain battery 103, often at high rates, which may become a safety hazard. In FIG. 1(b), a diode 110 is added to prevent discharge of battery 103 in the event of an electrical short between electrical contacts 105 and 106. However, a disadvantage of this system is that the charging means 107 can no longer monitor the battery voltage 111 directly, but rather monitors the battery voltage 111 plus the voltage drop across diode 110. Since the voltage drop across diode 110 depends on its temperature and the current flowing through it, the charging means 107 cannot precisely determine battery voltage 111. For some battery chemistries, precise control of the battery voltage is essential to safety or performance.

FIG. 2 shows a system 100 (according to the prior art) in which the charging means 107 has been moved from the battery charger 102 to the battery-operated device 101. As illustrated in FIG. 2, the battery charger 102 further comprises power supply 112. Power supply 112 typically has its own output short-circuit protection. A short circuit across electrical contacts 105 and 106 is now isolated from battery 103 by charging means 107. With no voltage applied to charging means 107, the charging means shuts down and battery 103 is not discharged by the short circuit. While the system shown in FIG. 2 eliminates the short-circuit disadvantage of the circuit illustrated in FIG. 1(a), a disadvantage of the system of FIG. 2 is the battery-operated device 101 contains the additional circuitry of charging means 107 which requires additional space. For small devices, such as wireless earbuds and hearing devices, the extra space taken by charging means 107 can be a large disadvantage. Also, while charging, power dissipation of charging means 107 must be considered and for small devices may cause overheating within battery-operated device 101.

Figure 3:
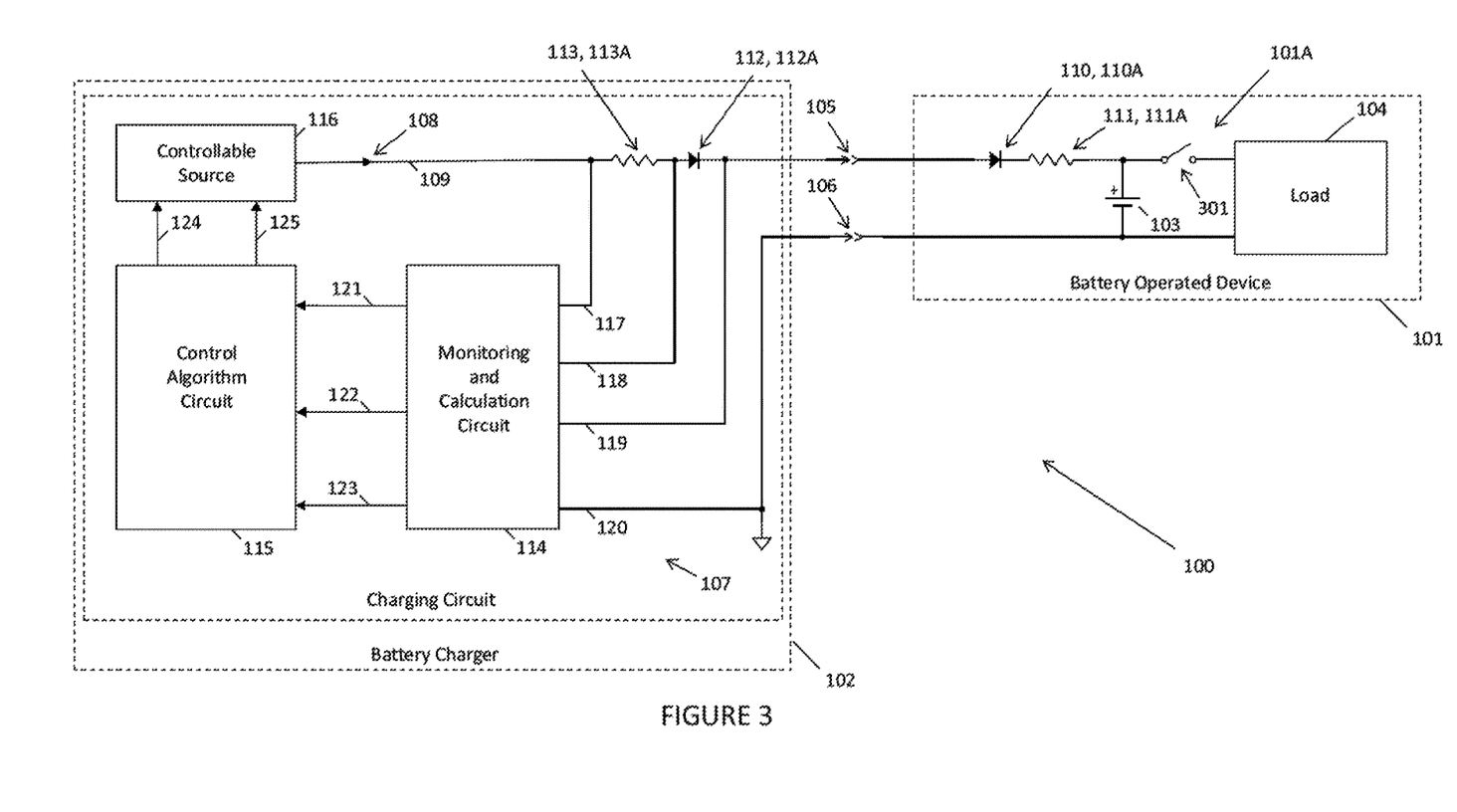
FIG. 3 illustrates one example configuration of the present disclosure.

FIG. 3 shows an illustrative configuration of a battery charging system according to the present disclosure. System 100 comprises a battery-operated device 101 and a battery charger 102 which are electrically connected by two electrical terminals, i.e., first electrical terminal 105 and second electrical terminal 106 during charging operations. The battery-operated device 101 comprises a first diode 110, a first resistor 111, a battery 103 (which may be a rechargeable battery), a switch 301, and a load 104. The first diode 110, the first resistor 111, battery 103, switch 301, and load 104 substantially define a load circuit 101A. The battery charger 102 comprises a second diode 112, a second resistor 113, a monitoring and calculation circuit 114, a control algorithm circuit 115, and a controllable power source 116 wherein an output current 108 and output voltage 109 are controllable by at least one input signal, i.e., signals 124 and 125. The second diode 112, the second resistor 113, the monitoring and calculation circuit 114, the control algorithm circuit 115, and controllable power source 116 substantially define a charging circuit 107. First diode 110, when electrically connected to controllable power source 116, will experience a first forward voltage drop 110A across the diode. Similarly, Second diode 112, first resistor 11, and second resistor 113, when electrically connected to controllable power source 116, will experience a second voltage drop 112A, a third voltage drop 111A, and a fourth voltage drop 113A, respectively.

As illustrated in FIG. 3, first diode 110 arranged between first electrical terminal 105 and battery 103 prevents battery 103 from being discharged if electrical terminals 105 and 106 become electrically connected, hence providing short-circuit protection for battery-operated device 101. First resistor 111 provides a current limiting function, i.e., first resistor limits the potential current to battery 103. In some embodiments of the present disclosure, first resistor 11/ may be omitted. Switch 301, arranged between battery 103 and load 104, provides means to disconnect the load 104 from battery 103 during battery charging operation when provided with a threshold voltage 301A (shown in FIGS. 4 and 5). The threshold voltage 301A can be any voltage which sufficiently activates/triggers switch 301. Switch 301 may also be used as part of the on/off control of the battery-operated device 101.

Monitoring and calculation circuit 114 monitors several voltages, i.e., first input voltage 117, second input voltage 118, and third input voltage 119. First input voltage 117 is equivalent to the output voltage 109 of the controllable power source 116. Second input voltage 118 is defined as the difference between the first input voltage 117 and the fourth voltage drop 113A across second resistor 113. Third input voltage 119 is defined as the difference between the second input voltage 118 and the second voltage drop 112A across second diode 112.

From these voltages, the monitoring and calculation circuit 114 calculates several output signals, i.e., first output signal 121, second output signal 122, and third output signal 123. The first output signal 121 is defined by the voltage difference between the third input voltage 119 and the first input voltage 117 subtracted from the third input voltage 119. The second output signal 122 is defined by the difference between the first input voltage 117 and second input voltage 118. The third output signal 123 is defined by the difference between the third input voltage 119 and the first ground 120.

First output signal 121, second output signal 122, and third output signal 123 represent the actual battery voltage, a scaled version of the charging current (as second output signal 122 is defined by the difference in two voltages over a known resistance, i.e., first and second input voltages 117 and 118 and the resistance of resistor 113), and the battery charger output voltage at first electrical contact 105, respectively. These output signals 121, 122 and 123, are then input into control algorithm circuit 115, which in turn generates output signals 124 and 125, which are used by the controllable source 116 to set an output current 108 and/or an output voltage 109.

Figure 4:
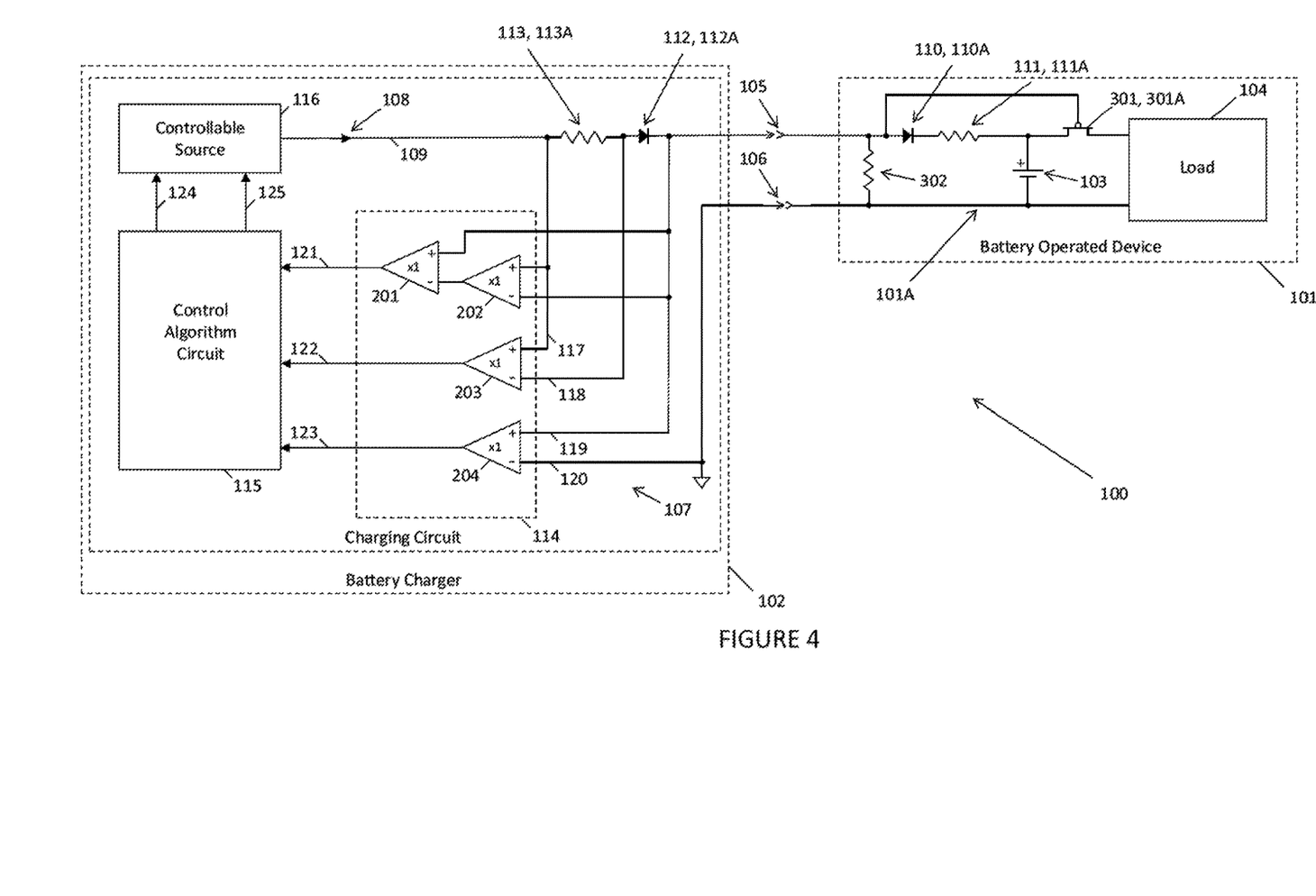
FIG. 4 illustrates one example embodiment of the present disclosure showing one implementation of a monitoring and calculation circuit within a battery charger and one implementation of an on/off load switch within a battery-operated device.

FIG. 4 shows one example implementation of monitoring and calculation circuit 114 and an example implementation of load switch 301. As shown in FIG. 4, load switch 301 is implemented as a P-channel metal-oxide-semiconductor field-effect transistor (MOSFET). The gate of transistor/switch 301 is connected to first electrical terminal 105. A third resistor, i.e., resistor 302 provides a DC path to the electrical ground of the device. Second electrical terminal 106 is also connected to the electrical ground. With no battery charger connected to the device, the voltage at electrical terminal 105 (relative to electrical terminal 106) is zero volts. Zero volts applied to the gate of transistor 301 causes the transistor to turn on. With a charger connected to electrical terminals 105 and 106, the positive voltage at terminal 105, i.e., a voltage greater than or equal to the threshold output voltage 301A, will cause transistor 301 to turn off and thereby disconnect load 104 from battery 103. This may be advantageous during charging as substantially all charging current will flow to battery 103. A small amount of current will flow through resistor 302. As explained below, charging circuit 107 can compensate for the current flowing through third resistor 302.

In FIG. 4, battery charger 102 comprises charging circuit 107 which further comprises monitoring and calculation circuit 114, control algorithm circuit 115, controllable source 116, second resistor 113, and second diode 112. One example implementation of monitoring and calculation circuit 114 accepts voltages 117, 118 and 119 relative to electrical ground 120.

Monitoring and calculation circuit 114 monitors several voltages, i.e., first input voltage 117, second input voltage 118, and third input voltage 119. First input voltage 117 is equivalent to the output voltage 109 of the controllable power source 116. Second input voltage 118 is defined as the difference between the first input voltage 117 and the fourth voltage drop 113A across second resistor 113. Third input voltage 119 is defined as the difference between the second input voltage 118 and the second voltage drop 112A across second diode 112.

From these voltages, the monitoring and calculation circuit 114 calculates several output signals, i.e., first output signal 121, second output signal 122, and third output signal 123. The first output signal 121 is defined by the voltage difference between the third input voltage 119 and the first input voltage 117, subtracted from the third input voltage 119. The second output signal 122 is defined by the difference between the first input voltage 117 and second input voltage 118. The third output signal 123 is defined by the difference between the third input voltage 119 and the first ground 120.

First output signal 121, second output signal 122, and third output signal 123 represent the actual battery voltage, a scaled version of the charging current, and the battery charger output voltage at first electrical contact 105, respectively. These output signals 121, 122 and 123, are then input into control algorithm circuit 115, which in turn generates output signals 124 and 125, which are used by the controllable source 116 to set an output current 108 and/or an output voltage 109 for the charging circuit.

In one example embodiment, the means of calculating voltage signals 121, 122, and 123, are unity-gain difference amplifiers placed within monitoring and calculation circuit 114. As such, first and second unity-gain amplifiers 201 and 202 are provided to calculate first output signal 121; third unity-gain difference amplifier 203 is provided to calculate second output signal 122; and, fourth unity-gain difference amplifier 204 is provided to calculate the third output signal 123.

To calculate the output signals 124 and 125, the control algorithm circuit further comprises a central processing unit 127 and memory 128. Memory 128 is arranged to receive and store output signals 121, 122, and 123, and calculate, based on at least one of these output signals, signals 124 and 125 to be sent to controllable power source 116.

It should be appreciated that although the monitoring and calculation circuit, and the unity gain amplifiers 201-204 as described in one example embodiment herein, generate(s) output signals 121, 122, and 123 by subtracting, or finding the difference between, certain voltages. e.g., signal 122 is defined as the difference between the first input voltage 117 and the second input voltage 118; signal 122 could also be generated by various logical components adapted to add, multiply, or divide, the input voltages. Depending on the operation performed in the monitoring and calculation circuit, the control algorithm circuit would simply adapt to a different magnitude for output signals 121, 122, and 123 and send a substantially similar output signal 124 and/or 125 to controllable power source 116 in order to set the output voltage 109 and/or the output current 108.

To understand the operation of this system let: V103 represent the actual voltage of battery 103; R111 and R113 represent the resistance values of first and second resistors 111 and 113 respectively; 110A and 111A represent the forward voltage drop of diodes 110 and 112 respectively; V105, V117, V118, V119, V121, V122, and V123 represent the voltages of signals at 105, 117, 118, 119, 121, 122 and 123 respectively, and I111, I113, and I302 represent the electrical current through resistors 111, 113, and 302 respectively. To simplify the analysis, let R302 be infinitely large in value such that the current through resistor 302 may be neglected, then it can be shown that:

$$V117 = V105 + I113 \times R113 + 111A \quad \text{(Eq. 1)}$$

$$V118 = V119 + 111A \quad \text{(Eq. 2)}$$

$$V119 = V103 + I111 \times R111 + 110A \quad \text{(Eq. 3)}$$

$$V121 = V119 - (V117 - V119) \quad \text{(Eq. 4)}$$

$$V122 = V117 - V118 \quad \text{(Eq. 5)}$$

$$V123 = V119 \quad \text{(Eq. 6)}$$

Combining and rearranging equations (1) through (6), charger output voltage, battery charging current and battery voltage can be determined. The charger output voltage is simply V123. The battery charging current is the same as the current flowing through resistor 113. V122 represents a scaled version of the battery charging current and is given by V122 divided by R113. Finally, the battery voltage V103 can be expressed as follows:

$$V103 = V121 + I113 \times R113 + 112A - I111 \times R111 - 110A \quad \text{(Eq. 7)}$$

If the value of resistors 111 and 113 are selected to be substantially the same as one another, and diodes 110 and 112 are selected to be the same type, thereby having substantially the same forward voltage drop for the same current and temperature, and since the current through resistors 111 and 113 must be substantially the same, equation (7) simplifies to:

$$V103 = V121 \quad \text{(Eq. 8)}$$

Therefore, regardless of the battery charging current, the battery voltage V103 can be determined through a two-contact electrical interface even though there is a short-circuit prevention diode 110 and resistor 111 between the actual battery and battery charger 102.

Figure 5:
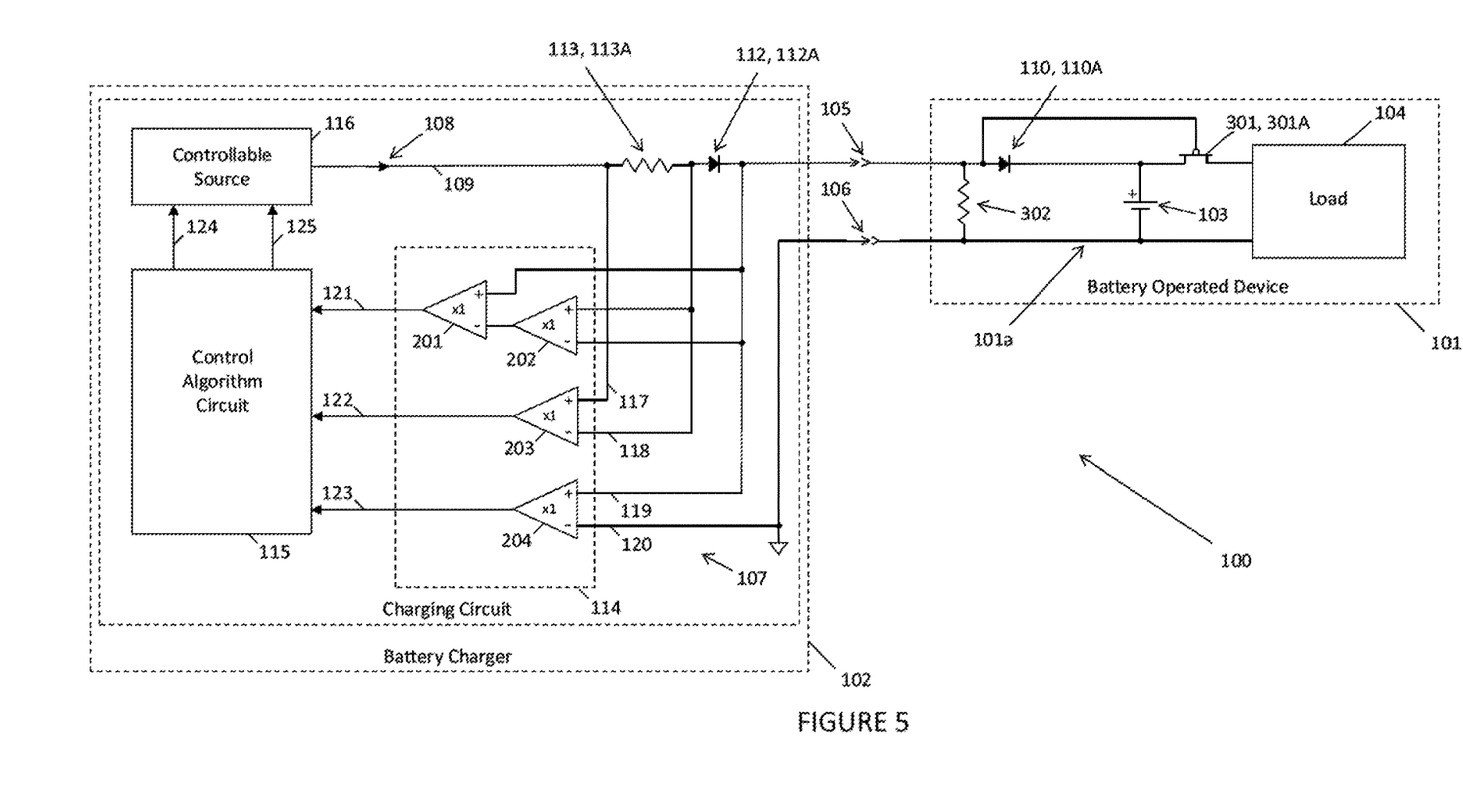
FIG. 5 illustrates one example embodiment of the present disclosure showing another implementation of the monitoring and calculation circuit.

FIG. 5 shows another example implementation of the monitoring and calculation circuit 114 according to the present disclosure. In this embodiment, first resistor 111, as shown in FIG. 4, in battery-operated device 101 has been eliminated. In battery charger 102, unity-gain difference amplifiers 203 and 204 perform the same functions as described for FIG. 4, i.e., calculate output signals 122 and 123, respectively. However, the voltages that are used to calculate output signal 121 have changed. As accounting for the voltage drop of resistor 111 is no longer needed, output signal 121 is now defined as the voltage difference between the third input voltage 119 and the second input voltage 118, subtracted from the third input voltage 119. Therefore, unity-gain difference amplifiers 201 and 202 have been reconfigured and the battery voltage V103 is now given by:

$$V103 = V121 + 112A - 110A \quad \text{(Eq. 9)}$$

Similar to the embodiment illustrated in FIG. 4, diodes 110 and 112 are selected to be the same type and therefore have substantially the same forward voltage drop for the same current and temperature. Equation (9) then simplifies to equation (8) as it did before.

Finally, the control algorithm circuit 115 accepts one or more of output signals 121, 122, and 123, and performs the necessary control algorithm calculations to output at least one of signals 124 and 125 to control the limits of voltage 108 and current 109 of controllable source 116. Controllable source 116 outputs a current 108 and voltage 109 to charge battery 103.

One skilled in the art will recognize that the monitoring and calculation circuit may be replace with analog-to-digital converters (ADCs) and digital computation means. The ADCs and digital computation means may be contained within a single micro-computer unit (MCU). The MCU may also implement one or both of the control algorithm circuit 115 and the controllable power source 116.

As used herein, the term "monitoring and calculation circuit" is intended to mean any suitable logical circuit that can accept at least two input voltages and determine the net difference between the at least two input voltages. Suitable logical circuit elements include but are not limited to diodes, unity-gain difference amplifiers, buffer amplifiers, voltage buffer amplifiers, voltage followers, Transistor-Transistor Logic (TTL) gates, Complementary Metal-Oxide-Semiconductors (CMOS), microprocessors, etc.

As used herein, the term "threshold output voltage 301A" is intended to mean any minimum voltage sufficient to activate/trigger switch 301.

As used herein with respect to the present invention, the terms "output voltage 109" and/or "the output voltage" are intended to mean any voltage within a range of voltages greater than or equal to the threshold output voltage 301A but less than or equal to the maximum manufacturer recommended voltage for the particular battery chemistry used in the battery-operated device.

As used herein with respect to the present invention, the terms "output current 108" and/or "the output current" are intended to mean any current within a range of currents that in conjunction with any circuit component having a resistance as described herein, produces output voltage 109 and/or the output voltage.

As used herein, the term "control algorithm circuit" is intended to mean a circuit which contains at least one microcontroller having a memory and a central processing unit, where the central processing unit is arranged to receive non-transitory computer readable instructions stored in the memory where the computer readable instructions are arranged receive and store at least one input from the monitoring and calculation circuit as described herein and calculate at least one output signal based on a dependency of manufacturer instructions for charging a particular battery in a battery-operated device as defined below. The dependency of manufacture instructions may include acceptable and non-acceptable operating temperatures for a particular battery chemistry, values of float charges, e.g., a constant voltage, for charging a particular chemistry, and voltages as a dependency of time. Computer readable instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including for example object oriented programming languages and procedural programming languages. It should further be appreciated that the logical calculations of the control algorithm do not require software, i.e., the computations could be completed entirely in hardware-based logic structures.

As used herein, the term "charging circuit" is intended to mean at least a controllable power source and a monitoring and calculating circuit as defined herein.

As used herein, the term "battery-operated device" is intended to mean any device that contains a capacitor (e.g., super-cap high capacitance capacitor), or contains or is capable of utilizing batteries (including rechargeable batteries) as a primary power source. Suitable battery-operated devices may include but are not limited to wired and wireless headphones, wired and wireless earbuds, or other suitable hearing devices that utilize batteries as their primary power source.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, and/or pneumatics. It should be appreciated that the term "substantially" is synonymous with terms such as "nearly," "very nearly," "about," "approximately," "around," "bordering on," "close to," "essentially," "in the neighborhood of," "in the vicinity of;" etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

Moreover, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element, a device comprising a third element; a device comprising a first element and a second element; a device comprising a first element and a third element; a device comprising a first element, a second element and a third element; or, a device comprising a second element and a third element.

While several inventive examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive examples described herein. It is, therefore, to be understood that the foregoing examples are presented by way of example only and that, within the scope of the appended claims and equivalents thereto, inventive examples may be practiced otherwise than as specifically described and claimed. Inventive examples of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the inventive scope of the present disclosure.

The invention claimed is:

1. A battery charging system with short-circuit protection comprising:
    a battery-operated device configured to be connectable to a battery charger, the battery operated device comprising a load circuit defining a load for the battery-operating device, a battery electrically connected to the load circuit, a first electrical terminal electrically connected to the battery, a second electrical terminal electrically connected to the battery, and a first diode arranged between the first electrical terminal and the battery, the first diode having a first voltage drop and the first diode configured to provide short circuit-protection for the battery; and,
    the battery charger configured to charge the battery of the battery-operated device, the battery charger having a charging circuit, the charging circuit comprising a controllable power source, a monitoring and calculation circuit, a control algorithm circuit, and a second diode arranged between the controllable power source and the first electrical terminal of the battery-operated device when the battery charger is connected to the battery-operated device, the second diode having a second voltage drop, and the second diode electrically connected to the monitoring and calculation circuit;
    wherein the first voltage drop across the first diode is substantially the same as the second voltage drop across the second diode, such that the monitoring and calculation circuit and the control algorithm circuit calculate an output voltage to be sent from the controllable power source to the battery of the battery-operated device and such that the charging circuit of the battery charging system maintains the ability to determine characteristics of the battery.

2. The battery charging system recited in claim 1 wherein the battery-operated device further comprises a first resistor arranged in the load circuit between the first electrical terminal and the battery, the first resistor having a third voltage drop.

3. The battery charging system recited in claim 2 wherein the battery charger further comprises a second resistor arranged between the controllable power source and the first electrical terminal of the battery-operated device when the battery charger is connected to the battery-operated device, the second resistor having a fourth voltage drop, wherein the third voltage drop and the fourth voltage drop are substantially the same, such that the monitoring and calculation circuit and the control algorithm circuit calculate the output voltage to be sent from the controllable power source to the battery of the battery-operated device.

4. The battery charging system recited in claim 3 wherein the monitoring and calculation circuit is arranged to accept a first input voltage equivalent to the output voltage of the controllable power source, a second input voltage defined as the difference between the first input voltage and the fourth voltage drop across the second resistor, and a third input voltage defined as the difference between the second input voltage and the second voltage drop across the second diode.

5. The battery charging system recited in claim 4 wherein the monitoring and calculation circuit is arranged to output a first output signal, a second output signal, and a third output signal, where the first output signal is defined by the voltage difference between the third input voltage and the first input voltage subtracted from the third input voltage; the second output signal is defined by the difference between the first input voltage and the second input voltage; and, the third output signal is defined by the difference between the third input voltage and a first ground.

6. The battery charging system recited in claim 5, wherein the control algorithm circuit receives the first output signal, the second output signal and the third output signal and calculates at least one fourth output signal which indicates the output voltage to be generated by the controllable power source.

7. The battery charging system recited in claim 1 wherein the load circuit of the battery operated device further comprises a switch arranged between the battery and the load arranged to open when the battery receives a threshold output voltage.

8. The battery charging system recited in claim 7 wherein the switch is a metal-oxide-field-effect-transistor (MOSFET).

9. The battery charging system recited in claim 1 wherein the monitoring and calculating circuit comprises a first unity-gain difference amplifier, a second unity-gain difference amplifier a third unity-gain difference amplifier, and a fourth unity-gain difference amplifier.

10. The battery charging system recited in claim 1, wherein the battery is a rechargeable battery or a capacitor.

11. A battery charging system with short-circuit protection comprising:
a battery-operated device configured to be connectable to a battery charger, the battery-operated device comprising a load circuit defining a load for the battery-operating device, a battery electrically connected to the load circuit, a first electrical terminal electrically connected to the battery, a second electrical terminal electrically connected to the battery, and a first diode arranged between the first electrical terminal and the battery, the first diode having a first voltage drop, and the first diode configured to provide short circuit-protection for the battery; and, the battery charger configured to charge the battery of the battery-operated device, the battery charger having a charging circuit, the charging circuit comprising a controllable power source, a monitoring and calculation circuit, a control algorithm circuit, a second diode arranged between the controllable power source and the first electrical terminal of the battery-operated device when the battery charger is connected to the battery-operated device, the second diode having a second voltage drop, and the second diode electrically connected to the monitoring and calculation circuit, and a resistor arranged between the controllable power source and the first electrical terminal;
wherein the first voltage drop across the first diode is substantially the same as the second voltage drop across the second diode, such that the monitoring and calculation circuit and the control algorithm circuit calculate an output voltage to be sent from the controllable power source to the battery of the battery-operated device and such that the charging circuit of the battery charging system maintains the ability to determine characteristics of the battery.

12. The battery charging system recited in claim 11 wherein the resistor has a third voltage drop.

13. The battery charging system recited in claim 12 wherein the monitoring and calculation circuit is arranged to accept a first input voltage equivalent to the output voltage of the controllable power source, a second input voltage defined as the difference between the first input voltage and the third voltage drop across the resistor, and a third input voltage defined as the difference between the second input voltage and the second voltage drop across the second diode.

14. The battery charging system recited in claim 13 wherein the monitoring and calculation circuit is arranged to output a first output signal, a second output signal, and a third output signal, where the first output signal is defined by the voltage difference between the third input voltage and the second input voltage subtracted from the third input voltage; the second output signal is defined by the difference between the first input voltage and the second input voltage; and, the third output signal is defined by the difference between the third input voltage and a first ground.

15. The battery charging system recited in claim 14, wherein the control algorithm circuit receives the first output signal, the second output signal, and the third output signal and calculates at least one fourth output signal which indicates the output voltage to be generated by the controllable power source.

16. The battery charging system recited in claim 15, wherein the control algorithm circuit comprises at least one central processing unit and at least one memory, or a set of hardware-based logic structures, arranged to store a set of non-transitory computer readable instructions to calculate the at least one fourth output signal based at least partially on the first output signal, the second output signal, or the third output signal.

17. The battery charging system recited in claim 11 wherein the load circuit of the battery operated device further comprises a switch arranged between the battery and the load arranged to open when the battery receives a threshold output voltage.

18. The battery charging system recited in claim 17 wherein the switch is a metal-oxide-field-effect-transistor (MOSFET).

19. The battery charging system recited in claim 11 wherein the monitoring and calculating circuit comprises a first unity-gain difference amplifier, a second unity-gain difference amplifier, a third unity-gain difference amplifier, and a fourth unity-gain difference amplifier.

20. The battery charging system recited in claim 11, wherein the battery is a rechargeable battery or a capacitor.

* * * * *